US011886936B2

(12) United States Patent
Yamasaki et al.

(10) Patent No.: US 11,886,936 B2
(45) Date of Patent: Jan. 30, 2024

(54) DATA PROCESSING APPARATUS, DATA PROCESSING METHOD, AND STORAGE MEDIUM STORING THEREIN DATA PROCESSING PROGRAM

(71) Applicant: KABUSHIKI KAISHA TOSHIBA, Tokyo (JP)

(72) Inventors: Tomohiro Yamasaki, Tokyo (JP); Yoshiyuki Kokojima, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 64 days.

(21) Appl. No.: 17/462,470

(22) Filed: Aug. 31, 2021

(65) Prior Publication Data
US 2022/0253346 A1    Aug. 11, 2022

(30) Foreign Application Priority Data

Feb. 9, 2021    (JP) .................................. 2021-019078

(51) Int. Cl.
*G06F 9/54* (2006.01)
(52) U.S. Cl.
CPC ................... *G06F 9/542* (2013.01)
(58) Field of Classification Search
CPC ..... G06F 9/542; G06F 16/1734; H04L 41/06; H04L 41/0604
USPC ........................................................ 719/318
See application file for complete search history.

(56) References Cited

U.S. PATENT DOCUMENTS

| 8,676,738 | B2* | 3/2014 | Kawai | G06F 16/367 |
| | | | | 706/48 |
| 9,152,623 | B2* | 10/2015 | Wroczyński | G06F 40/284 |
| 10,970,313 | B2 | 4/2021 | Tao et al. | |
| 11,037,062 | B2* | 6/2021 | Nakata | G06N 5/025 |
| 11,132,541 | B2* | 9/2021 | Winder | G06F 40/295 |

(Continued)

FOREIGN PATENT DOCUMENTS

| JP | 2019-197355 A | 11/2019 |
| JP | 2021-71744 A | 5/2021 |

OTHER PUBLICATIONS

Wei, J. et al. "EDA: Easy Data Augmentation Techniques for Boosting Performance on Text Classification Tasks" Proceedings of the 2019 Conference on Empirical Methods in Natural Language Processing and the 9th International Joint Conference on Natural Language Processing, Nov. 3-7, 2019, 7 pages.

(Continued)

*Primary Examiner* — Andy Ho
(74) *Attorney, Agent, or Firm* — Oblon, McClelland, Maier & Neustadt, L.L.P.

(57) ABSTRACT

According to one embodiment, a data processing apparatus includes a processor provided with hardware. The processor extracts a first event data item, a second event data item, and a third event data item from input first document data. When a first relational data item indicating a presence of transitivity between the first event data item and the second event data item is extracted and a second relational data item indicating a presence of transitivity between the second event data item and the third event data item is extracted, the processor generates a third relational data item indicating a presence of a relation between the first event data item and the third event data item.

9 Claims, 6 Drawing Sheets

(56) References Cited

U.S. PATENT DOCUMENTS

2014/0372102 A1* 12/2014 Hagege ................ G06F 40/295
704/9
2021/0127022 A1 4/2021 Ito et al.

OTHER PUBLICATIONS

Minoru Naito et al., "Consideration on Wikipedia Phenomenon Model Construction Method for Obtaining Similarity Relationships Between Entities", Database Society of Japan, Aug. 30, 2012, pp. 2-11, DEIM Forum 2012 E5-4.
Naoto Asahi et al., "Finding Intermediate Entities by Detecting Order of Entities Based on Aggregation of Comparative Sentences", Information Processing Society of Japan, vol. 52, No. 12, pp. 3527-3541, Dec. 15, 2011.

* cited by examiner

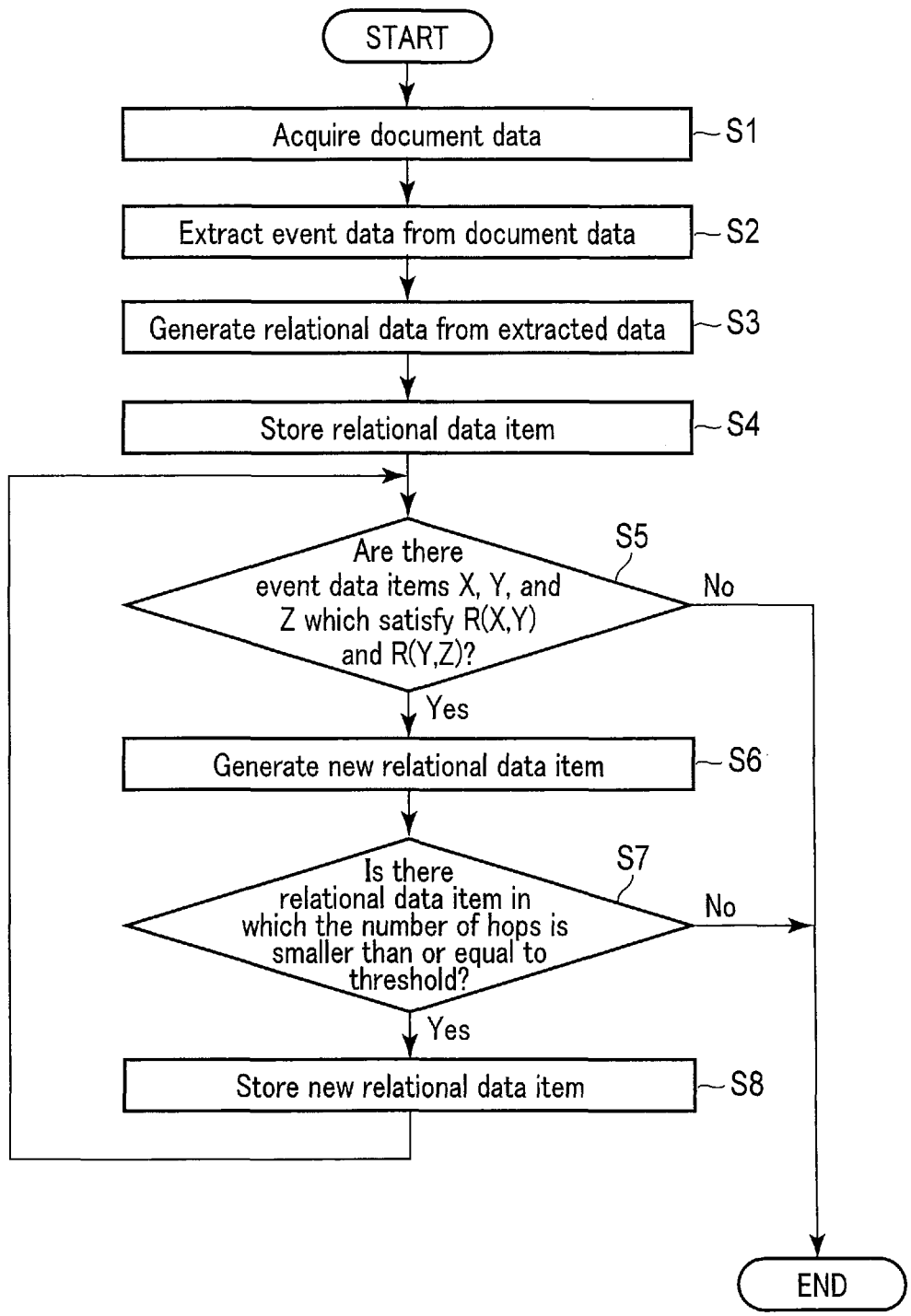
F I G. 3

While conducting an external inspection in preparation for commissioning of a secondary water supply pump during the last periodic inspection, a worker found water dripping under a welded portion where a seal water injection pipe was attached. Thus, a service person peeled off the paint on the relevant portion, and confirmed that seal water was seeping out from the area around the pipe attachment weld.

F I G. 4

| A | conducting an external inspection |
|---|---|
| B | a welded portion where a seal water injection pipe was attached |
| C | a service person peeled off the paint on the relevant portion |
| D | confirmed that seal water was seeping out from the area around the pipe attachment weld |

F I G. 5

| First item | Second item | Number of hops | Relation strength |
|---|---|---|---|
| A | B | 1 | 1 |
| B | C | 1 | 1 |
| C | D | 1 | 1 |

| | |
|---|---|
| A' | was checking appearance |
| B' | found water leakage from the welded portion where a seal water injection pipe was attached |
| E | a service person isolated the pump |
| F | the water leakage from the welded portion stopped |

FIG. 9

| First item | Second item | Number of hops | Relation strength |
|---|---|---|---|
| A' | B' | 1 | 1 |
| E | F | 1 | 1 |

FIG. 10

| Document 1 | Document 2 | Similarity |
|---|---|---|
| A | A' | 0.9 |
| B | B' | 0.85 |
| ... | ... | ... |

FIG. 11

DATA PROCESSING APPARATUS, DATA PROCESSING METHOD, AND STORAGE MEDIUM STORING THEREIN DATA PROCESSING PROGRAM

CROSS-REFERENCE TO RELATED APPLICATIONS

This application is based upon and claims the benefit of priority from the Japanese Patent Application No. 2021-019078, filed Feb. 9, 2021, the entire contents of which are incorporated herein by reference.

FIELD

Embodiments described herein relate generally to a data processing apparatus, a data processing method, and a storage medium storing therein a data processing program.

BACKGROUND

When the number of events described in a document is N, the number of combinations of two events extracted from the N events while allowing duplicates is O ($N^2$). However, it is known that the actual number of relations between events is small. Thus, relations between events are imbalanced data, with numerous negative examples relative to positive examples. Therefore, machine learning of relations between events often does not work.

In the field of image recognition, reduction of negative examples by undersampling, increase of positive examples by oversampling, and the like have been performed. In the meantime, as a method for expanding data in the field of natural language processing, data expansion by replacing a word in a sentence with a synonym, randomly adding a word in a sentence, randomly deleting some words in a sentence, or randomly switching the order of words in a sentence has been proposed.

Use examples of a document include automatic analysis of a cause, etc. of a trouble described in a document from an event described in the document. A trouble may occur as a result of a series of a plurality of events. To analyze the cause, etc. of such a trouble that occurred as a result of a series of a plurality of events, it is necessary to ascertain transitivity between events, such as a temporal order relation or causal relation between events. Transitive relations that may occur between events are not fully utilized if data is merely expanded by replacement of a word with a synonym, random addition of a word, random deletion of some words, or random switching of the order of words in expressions of events described in a document.

BRIEF DESCRIPTION OF THE DRAWINGS

FIG. 3 is a flowchart showing an operation of generation of relational data as a data processing method by the data processing apparatus of the first embodiment.

FIG. 4 is a diagram showing an example of document data.

FIG. 5 is a diagram showing an example of event data.

FIG. 9 is a diagram showing an example of event data.

FIG. 10 is a diagram showing an example of relational data generated from the event data of FIG. 9.

FIG. 11 is a diagram showing an example of similarity calculation results.

DETAILED DESCRIPTION

In general, according to one embodiment, a data processing apparatus includes a processor provided with hardware. The processor extracts a first event data item, a second event data item, and a third event data item from input first document data. When a first relational data item indicating a presence of transitivity between the first event data item and the second event data item is extracted and a second relational data item indicating a presence of transitivity between the second event data item and the third event data item is extracted, the processor generates a third relational data item indicating a presence of a relation between the first event data item and the third event data item.

Hereinafter, embodiments will be described with reference to the accompanying drawings.

First Embodiment

Figure 1:
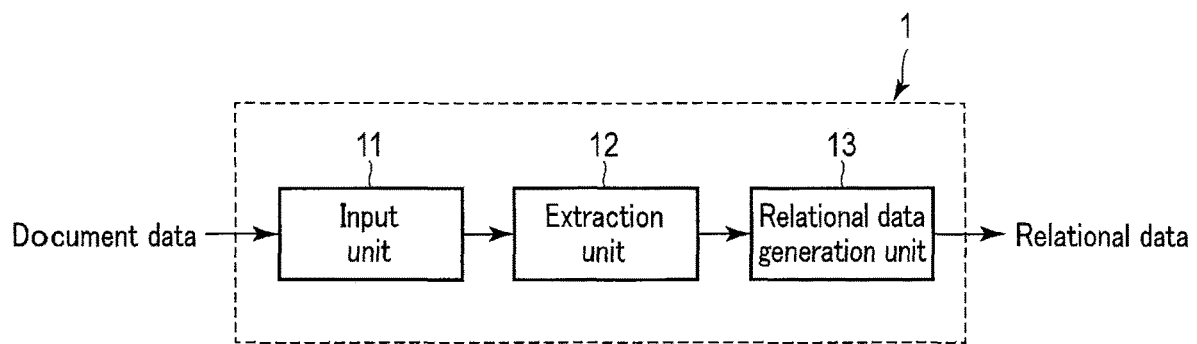
FIG. 1 is a diagram showing a configuration of an example of a data processing apparatus according to a first embodiment.

A first embodiment will be described. FIG. 1 is a diagram showing a configuration of an example of a data processing apparatus according to the first embodiment. A data processing apparatus 1 includes an input unit 11, an extraction unit 12, and a relational data generation unit 13.

The input unit 11 accepts an input of document data. The document data in the embodiment is data of a document describing a plurality of events. An event in the embodiment is constituted by a combination of a plurality of words describing, for example, "what did what". In the embodiment, there is a transitive relation between events. The transitive relation refers to a relation between a first event and a second event when a relation R therebetween has transitivity. The transitive relation between events refers to a relation wherein, when "If X, Y" and "If Y, Z" hold, then "If X, Z" holds, and may include, for example, an order relation between events, a causal relation between events, an identity relation between events, and an inclusion relation between events. For example, when events relating to a trouble are described in chronological order in a document, the order of events has a transitive relation.

The extraction unit 12 extracts event data from input document data. The extraction unit 12 resolves text included in the input document data into morphemes by, for example, morphological analysis, and extracts event data items based on the morphemes. The extraction unit 12 also extracts relational data representing a transitive relation between extracted event data items.

Based on the relational data extracted by the extraction unit 12, the relational data generation unit 13 generates relational data representing a new relation between events which is not included in the input document data.

Figure 2:
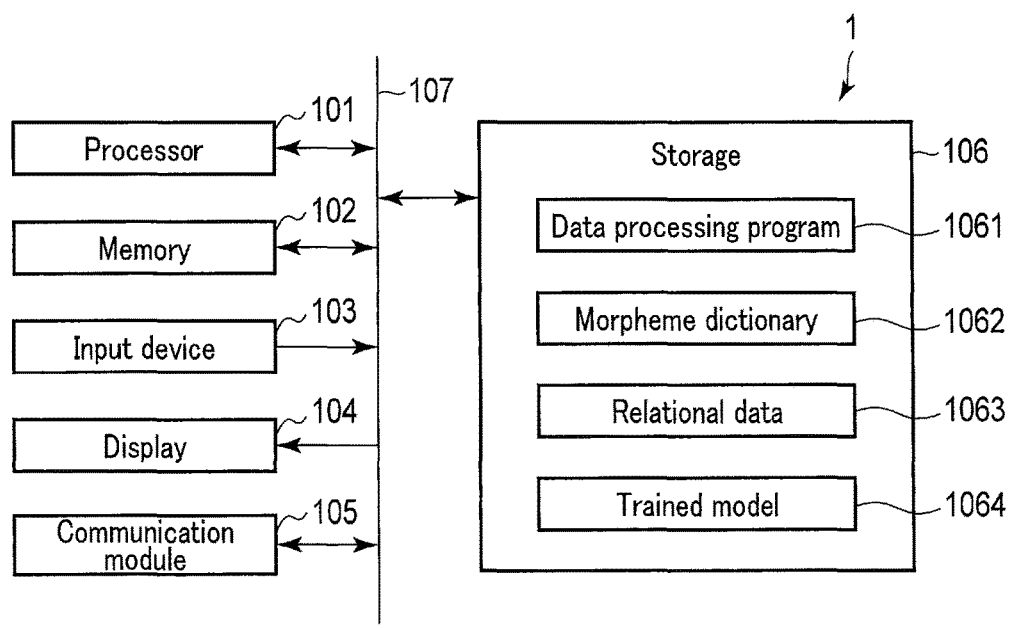
FIG. 2 is a diagram showing an example of a hardware configuration of the data processing apparatus.

FIG. 2 is a diagram showing an example of a hardware configuration of the data processing apparatus 1. The data processing apparatus 1 includes, for example, a processor 101, a memory 102, an input device 103, a display 104, a communication module 105, and a storage 106, as hardware. The processor 101, memory 102, input device 103, display 104, communication module 105, and storage 106 are connected by a bus 107. The data processing apparatus 1 may be a terminal device, such as a personal computer (PC), a smartphone, or a tablet terminal.

The processor 101 is a processor that controls the overall operation of the data processing apparatus 1. The processor 101 operates as the input unit 11, extraction unit 12, and relational data generation unit 13 through, for example, execution of a program stored in the storage 106. The processor 101 is, for example, a CPU. The processor 101 may be, for example, an MPU, GPU, ASIC, or FPGA. The processor 101 may be a single CPU, etc. or a plurality of CPUs, etc.

The memory 102 includes a ROM and a RAM. The ROM is a nonvolatile memory. The ROM stores therein a boot program, etc. of the data processing apparatus 1. The RAM is a volatile memory. The RAM is used as a working memory for, for example, processing in the processor 101.

The input device 103 is an input device such as a touch panel, a keyboard, or a mouse. When the input device 103 is operated, a signal corresponding to the operation is input to the processor 101 via the bus 107. The processor 101 performs various types of processing in accordance with the signal. The input device 103 may be used for, for example, an input of document data.

The display 104 is a display such as a liquid crystal display or an organic EL display. The display 104 displays various images.

The communication module 105 is a communication module for the data processing apparatus 1 to communicate with an external device. The communication module 105 may be a communication module for wire communication or a communication module for wireless communication.

The storage 106 is a storage such as a hard disk drive or a solid state drive. The storage 106 stores therein various programs, such as a data processing program 1061, executed by the processor 101. The storage 106 also stores therein a morpheme dictionary 1062 for morphological analysis of document data. The storage 106 also stores relational data 1063 previously generated. The storage 106 also stores a trained model 1064. The trained model 1064 is a model trained using the relational data 1063 and thereby constructed to automatically analyze a cause, etc. of a trouble described in a document from events described in the document. The morpheme dictionary 1062, relational data 1063, and trained model 1064 need not necessarily be stored in the storage 106. For example, the morpheme dictionary 1062, relational data 1063, and trained model 1064 may be stored in a server outside the data processing apparatus 1. In this case, the data processing apparatus 1 acquires necessary information by accessing the server through the communication module 105.

The bus 107 is a data transfer path for data exchange between the processor 101, memory 102, input device 103, display 104, communication module 105, and storage 106.

Next, an operation of the data processing apparatus 1 in the first embodiment will be described with specific examples. FIG. 3 is a flowchart showing an operation of generation of relational data as a data processing method by the data processing apparatus 1. The processing of FIG. 3 is executed by the processor 101.

In step S1, the processor 101 acquires document data. The document data may be input by a user. The user, for example, operates the input device 103 to input the document data. Let us assume that, for example, the document data shown in FIG. 4 is input.

In step S2, the processor 101 extracts event data from the document data. The processor 101 extracts the event data through, for example, morphological analysis and dependency parsing. For example, the processor 101 resolves text into morphemes through morphological analysis, and estimates a relation between clauses through dependency parsing. Then, the processor 101 extracts event data, which is a sequence of clauses. For example, let us assume that four event data items A, B, C, and D shown in FIG. 5 are extracted from the underlined portions of the document data shown in FIG. 4.

In step S3, the processor 101 generates relational data from the extracted event data. For example, the processor 101 extracts words representing transitivity between events from the morphologically analyzed document data. Words representing transitivity include a word, such as "while", "and", "when", "before", or "after", representing a temporal order relation between clauses, and a word, such as "thus", "if", or "because", representing a causal relation between clauses. When such a word representing transitivity can be extracted, the processor 101 generates a relational data item from the event data items connected by the extracted word representing transitivity.

In the example of FIG. 4, let us assume that the processor 101 extracts, as words representing transitivity, "while", "thus", and "and" underlined in FIG. 4. This means that there is a transitive relation between event data items A and B, which are connected by "while", between event data items B and C, which are connected by "thus", and between event data items C and D, which are connected by "and".

Figures 6, 7:
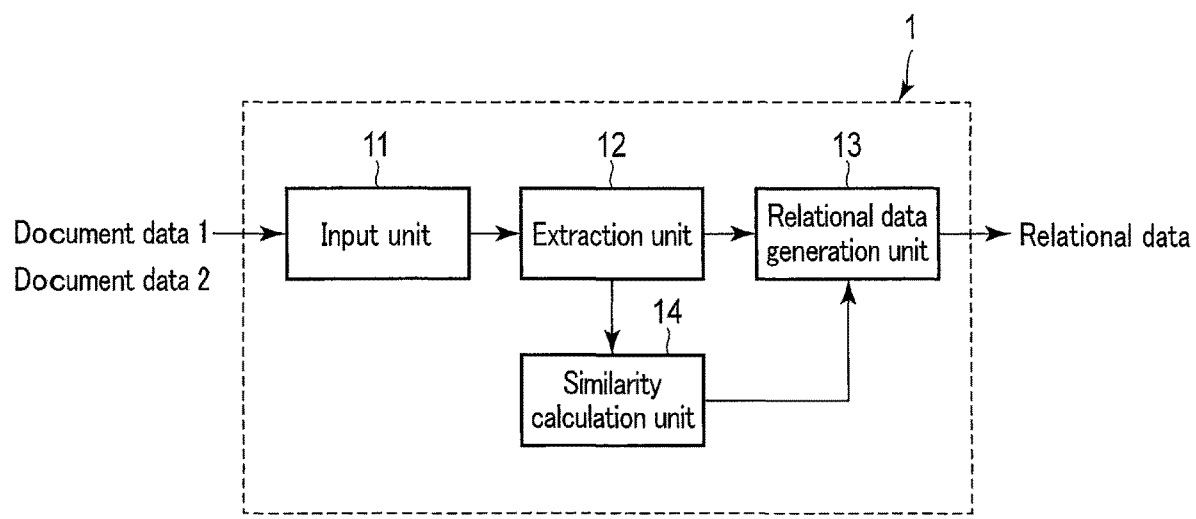
FIG. 6 is a diagram showing an example of relational data generated from the event data of FIG. 5.
FIG. 7 is a diagram showing a configuration of an example of a data processing apparatus according to a second embodiment.

FIG. 6 shows an example of relational data generated from the event data of FIG. 5. As shown in FIG. 6, each relational data item includes data on a first item, a second item, the number of hops, and a relation strength. The first item is a first event data item of two event data items having a transitive relation. For example, when the transitivity is a temporal order relation, the first event data item is a temporally preceding event data item, and when the transitivity is a causal relation, the first event data item is a cause event data item. The second item is a second event data item of two event data items having a transitive relation. For example, when the transitivity is a temporal order relation, the second event data item is a temporally subsequent event data item, and when the transitivity is a causal relation, the second event data item is a result event data item. The number of hops represents a distance in units of event data items from the first event data item to the second event data item on the document data. For example, when there is no event data item between the first event data item and the second event data item, the number of hops is 1. When there is one event data item between the first event data item and the second event data item, the number of hops is 2. The relation strength represents the strength of the relation between the first event data item and the second event data item. The relation strength takes a value in the range between 0 and 1, for example. The relation strength in a relational data item directly generated from the document data may be determined based on, for example, the number of hops. For example, the relation strength may be calculated to be closer to 1 as the number of hops becomes closer to 1.

In the example, two event data items having transitivity are identified by extracting a word representing transitivity between events. However, even when a temporal order relation or causal relation between events may be identified without identification of a word representing transitivity between events, the processor 101 may generate a relational data item from the events. Namely, the method for generating relational data from a document is not limited to a specific method.

In step S4, the processor 101 causes, for example, the storage 106 to store the generated relational data. The relational data stored in the storage 106 may be used for machine learning for the trained model 1064.

In step S5, the processor 101 refers to the relational data, and determines whether or not there are event data items X, Y, and Z which satisfy both transitive relation R(X,Y) and transitive relation R(Y,Z). Here, R(X,Y) denotes that there is a transitive relation R between the first event data item X and the second event data item Y. R(Y,X) denotes that there is a transitive relation R between the first event data item Y and the second event data item Z. In the example of FIG. 5, X, Y, and Z are each one of event data items A, B, C, and D. For example, the processor 101 compares event data items that appear as first items with event data items that appear as second items, and determines whether or not there is an event data item that appears as both first and second items. In the example of FIG. 6, event data items B and C each appear as both first and second items. In this case, there are event data items X, Y, and Z which satisfy both transitive relation R(X,Y) and transitive relation R(Y,Z). The processing proceeds to step S6 when it is determined in step S5 that there are event data items X, Y, and Z which satisfy both transitive relation R(X,Y) and transitive relation R(Y,Z). The processing of FIG. 3 ends when it is determined in step S5 that there are no event data items X, Y, and Z which satisfy both transitive relation R(X,Y) and transitive relation R(Y, Z).

In step S6, the processor 101 generates a new relational data item based on an event data item that appears as both first and second items. For example, the processor 101 generates a relational data item including, as the first item, an event data item that appears as the first item when the event data item that appears as both first and second items appears as the second item, and including, as the second item, an event data item that appears as the second item when the event data item that appears as both first and second items appears as the first item. The processor 101 also calculates the number of hops and the relation strength.

The processing of step S6 will be specifically described, using the example of FIG. 6. In the example of FIG. 6, event data items B and C each appear as both first and second items, as described above.

First, the processor 101 generates a new relational data item based on event data item B. The processor 101 first obtains a set of first items when event data item B appears as the second item. In the example of FIG. 6, the set of first items when event data item B appears as the second item is {A}. The processor 101 then obtains a set of second items when event data item B appears as the first item. In the example of FIG. 6, the set of second items when event data item B appears as the first item is {C}. Next, the processor 101 obtains a direct product of the set of first items and the set of second items. In the example of FIG. 6, the direct product set is {(A,C)}. The elements of the direct product set correspond to the first event data item and the second event data item of a new relational data item, respectively.

Similarly, the processor 101 generates a new relational data item based on event data item C. Namely, the processor 101 obtains a set of first items when event data item C appears as the second item and a set of second items when event data item C appears as the first item, and calculates a direct product set of these sets. In the example of FIG. 6, the direct product set is {(B,D)}. The elements of the direct product set correspond to the first event data item and the second event data item of a new relational data item, respectively.

After obtaining the direct product set, the processor 101 calculates the number of hops in the new relational data item. For example, the number of hops of the relational data item in which the first item is event data item A and the second item is event data item C is 2. Similarly, the number of hops of the relational data item in which the first item is event data item B and the second item is event data item D is 2.

The processor 101 also calculates the relation strength in the new relational data item. The relation strength may be determined based on, for example, a product, a minimum value, or the like of the relation strengths in the two original relational data items. In the example of FIG. 6, the relation strength in the relational data item in which the first item is event data item A and the second item is event data item C is 1. Similarly, the relation strength in the relational data item in which the first item is event data item B and the second item is event data item D is 1. The relation strength $\gamma$ in the new relational data item may be calculated by multiplying the relation strengths $\alpha$ and $\beta$ in the two original relational data items or a relation strength calculated from the relation strengths $\alpha$ and $\beta$ in the two original relational data items by an appropriate attenuation. The attenuation may be determined based on, for example, the number of hops. Accordingly, the relation strength F3 in the new relational data item may be calculated by performing an operation using a predetermined function f on the relation strengths F1 and F2 in the two original relational data items.

Let us return to the description of FIG. 3. In step S7, the processor 101 determines whether or not there is a new relational data item in which the number of hops is smaller than or equal to a threshold. For example, when a new relational data item is generated from a relational data item in which the number of hops is m (m is a natural number) and a relational data item in which the number of hops is n (n is a natural number), the threshold may be MAX(m,n)+1. In step S7, when it is determined that there is no new relational data item in which the number of hops is smaller than or equal to the threshold, the processing of FIG. 3 ends. In this case, no new relational data item is stored in, for example, the storage 106. The reason for setting such a limit to the number of hops is that it is questionable whether there is truly a transitive relation between events with too large a number of hops. Instead of limiting the number of hops, it is possible to prevent a relational data item from being stored in the storage 106 when the relation strength in the relational data item falls below a threshold due to the aforementioned attenuation. In step S7, when it is determined that there is a new relational data item in which the number of hops is smaller than or equal to the threshold, the processing proceeds to step S8.

In step S8, the processor 101 causes, for example, the storage 106 to store the newly generated relational data item. Then, the processing returns to step S5. In this case, similar processing is repeated with the relational data including the newly generated relational data item. In the example of FIG. 6, relational data items R(A,C) and R(B,D) are newly added. Therefore, by performing steps S5 and S6 again, a new relational data item in which the first item is event data item A and the second item is event data item D is generated. The number of hops of the new relational data item is 3. Accordingly, the new relational data item is also stored in, for example, the storage 106.

According to the first embodiment, regarding event data items X, Y, Z extracted from document data, when a relational data item indicating the presence of transitivity between event data item X and event data item Y and a relational data item indicating the presence of transitivity between event data item Y and event data item Z are extracted, a new relational data item indicating the presence of a relation between event data item X and event data item Z is generated, as described above.

Since a new relational item is generated in consideration of a transitive relation between events extracted from document data, a relational data item that can hold as a relation between events is likely to be generated. Namely, a newly generated relational data item in the first embodiment is likely to be a positive example. Use of such relational data for machine learning can suppress the imbalance between positive examples and negative examples, and a relation between events can be correctly learned.

In the embodiment, when a relational data item indicating the presence of transitivity between event data item X and event data item Y and a relational data item indicating the presence of transitivity between event data item Y and event data item Z are extracted, a new relational data item indicating the presence of a relation between event data item X and event data item Z is automatically generated. In this case, it is questionable whether there is truly transitivity between event data item X and event data item Z when the number of hops is large. To deal with this, in the embodiment, it is possible to generate a new relational data item indicating the presence of a relation between event data item X and event data item Z only when the similarity between event data item X and event data item Y is high in addition to when a relational data item indicating the presence of transitivity between event data item X and event data item Y and a relational data item indicating the presence of transitivity between event data item Y and event data item Z are extracted. Such processing further reduces the probability of generation of a negative example. The similarity will be described in detail in the second embodiment.

Second Embodiment

A second embodiment will be described. In the first embodiment, a new relational data item is generated based on event data items extracted from the same document data. Here, there may be document data describing almost the same transitive relation, with difference in expression only.

FIG. 7 is a diagram showing a configuration of an example of a data processing apparatus according to the second embodiment. A processing apparatus 1 includes an input unit 11, an extraction unit 12, a relational data generation unit 13, and a similarity calculation unit 14. As in the first embodiment, the processor 101 operates as the input unit 11, extraction unit 12, relational data generation unit 13, and similarity calculation unit 14 through, for example, execution of a program stored in the storage 106. In the second embodiment, descriptions of the configurations and operations similar to those of the first embodiment will be omitted or simplified as appropriate.

The input unit 11 and extraction unit 12 are the same as those in the first embodiment. The relational data generation unit 13 in the second embodiment generates new relational data, using event data extracted from document data (document data 1) as in the first embodiment. The relational data generation unit 13 in the second embodiment also generates new relational data, using event data with similar expressions to those of document data 1, which are extracted from other document data (document data 2).

The similarity calculation unit 14 calculates the similarity between event data items. The similarity takes a value in the range between 0 and 1, for example. For example, as the value of the similarity becomes larger, the degree of similarity between the corresponding event data items becomes higher. The similarity calculation unit 14, for example, digitizes, i.e., vectorizes, event data items, and calculates cosine similarity between vectorized event data items as the similarity between event data items.

Vectorization may be performed by utilizing, for example, a term frequency-inverse document frequency (TF-IDF) value. The similarity calculation unit 14 counts, as a DF value, the frequency of appearance of an event in which a set of morphemes obtained at the extraction unit 12 appears. The reciprocal of the DF value is the IDF value. The similarity calculation unit 14 also counts, as a TF value, the frequency of appearance of each morpheme for each relational data item stored in the storage 106. The similarity calculation unit 14 then obtains a product of the TF value and IDF value of each morpheme as a TF-IDF value. By a set of TF-IDF values included in an event data item, the event data item can be expressed as a vector.

The vectorization may be performed by utilizing a pre-trained deep learning model, such as bidirectional encoder representations from transformers (BERT). In this case, by morphemes included in each event data item being input to the BERT model, the event data item may be expressed as a vector. In this way, vectorization of an event data item may be performed based on any method as long as similarity can be calculated at the similarity calculation unit 14.

Figure 8:
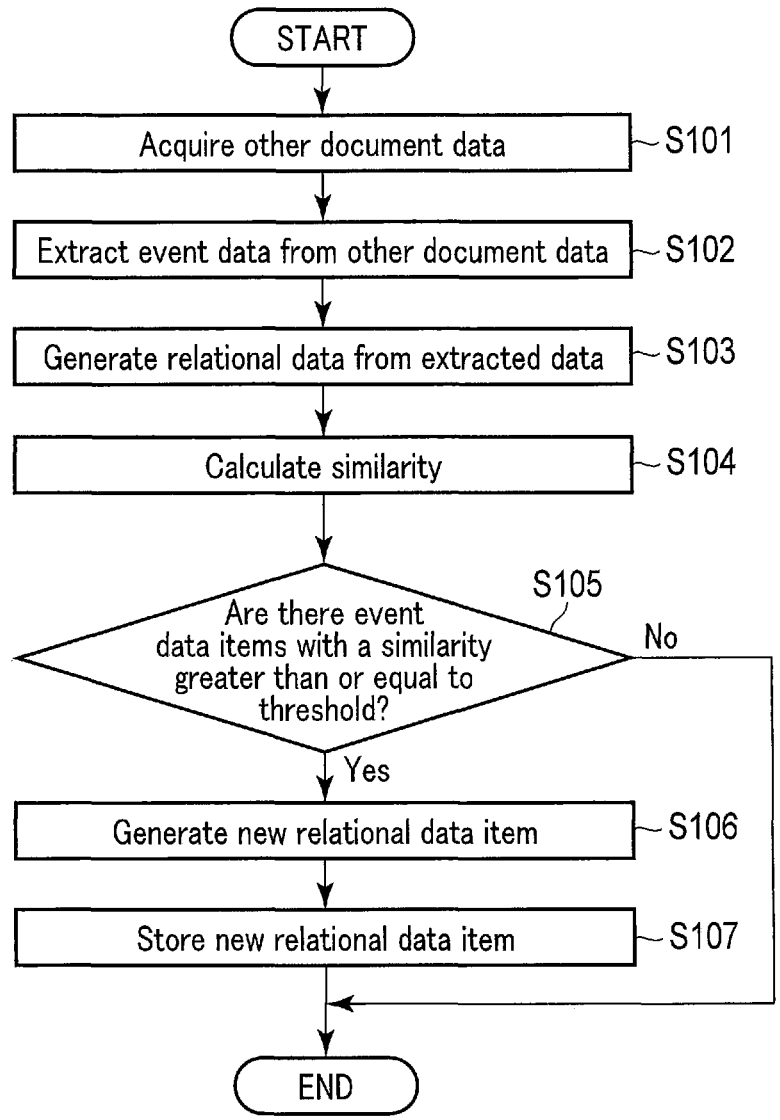
FIG. 8 is a flowchart showing an operation of generation of relational data as a data processing method by the data processing apparatus of the second embodiment.

Next, an operation of the data processing apparatus 1 in the second embodiment will be described, using specific examples. FIG. 8 is a flowchart showing an operation of generation of relational data as a data processing method by the data processing apparatus 1. The processing of FIG. 8 is executed by the processor 101. Let us assume that, prior to the processing of FIG. 8, the processing of the embodiment is performed on the document data shown in FIG. 4, which serves as document data 1. Therefore, the storage 106 already stores therein the relational data shown in FIG. 6 and relational data newly generated based on that relational data.

In step S101, the processor 101 acquires document data 2, which is other document data. The document data 2 may be input by a user. The user, for example, operates the input device 103 to input the document data 2.

In step S102, the processor 101 extracts event data from the document data 2. The processor 101 extracts the event data through, for example, morphological analysis. For example, let us assume that four event data items A', B', E, and F shown in FIG. 9 are extracted from the document data 2.

In step S103, the processor 101 generates relational data from the extracted event data. Let us assume that, for example, the relational data shown in FIG. 10 is generated from the document data 2.

In step S104, the processor 101 calculates the similarity between the relational data generated from document data 1 and the relational data generated from document data 2. For example, let us assume that there is a high similarity between event data item A and event data item A' and between event data item B and event data item B', as shown in FIG. 11.

In step S105, the processor 101 determines whether or not there is a relational data item with a high similarity. The processor 101 determines that there is a relational data item with a high similarity when there is a relational data item in which at least one of the similarity between a first event data item generated from document data 1 and a first event data item generated from document data 2 and the similarity between a second event data item generated from document data 1 and a second event data item generated from document data 2 is, for example, greater than or equal to a threshold, such as 0.80. If it is determined in step S105 that there is a relational data item with a high similarity, the processing moves to step S106. When it is determined in step S105 that there is no relational data item with a high similarity, the processing of FIG. 8 ends.

In step S106, the processor 101 generates a new relational data item based on the first and second event data items included in the relational data item with a high similarity. For example, the processor 101 generates a new relational data item in a similar manner to the first embodiment while regarding first event data items with a high similarity as the same event data item and regarding second event data items with a high similarity as the same event data item. For example, let us assume that event data item A is similar to event data item A', and event data item B is similar to event data item B'. In this case, as an event data item that appears as both a first item and a second item, there is event data item B' in addition to the event data items B and C in the example of the first embodiment. When event data items B and B' with a high similarity are regarded as the same, a set of first items when event data items B and B' appear as second items is {A,A'}. Similarly, a set of second items when event data items B and B' appear as first items is {C}. Therefore, the direct product set of these sets is {(A,C),(A',C)}. Therefore, a relational data item R(A',C), in which the number of hops is 2, is newly generated. Here, the relation strength in the new relational data item may be determined based on, for example, a product, a minimum value, or the like of the relation strengths in the two original relational data items, as in the first embodiment. Furthermore, in the second embodiment, the relation strength in the new relational data item may be calculated by multiplication by a factor corresponding to the similarity.

In step S107, the processor 101 causes, for example, the storage 106 to store the newly generated relational data item. Then, the processing of FIG. 8 ends. As in the first embodiment, similar processing may be repeated with the relational data including the newly generated relational data item. In this case, it is preferable to set a limit to the number of hops of relational data items to be adopted, as in the first embodiment.

As described above, in the second embodiment, new relational data is generated in consideration of relational data describing similar relations with a difference in expression only, which is extracted from other document data. This can further increase positive examples.

There are many cases where documents describe events with different granularity, such as the case where one document describes "Acid was produced as water leaked, which caused rust" and another document describes "water leaked, and thus rust was caused". In the second embodiment, from either of the two documents with different granularity, a relational data item describing a water leak as a cause and occurrence of rust as a result may be generated.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

The invention claimed is:

1. A data processing apparatus comprising a processor provided with hardware and configured to:
   extract a first event data item, a second event data item, and a third event data item from input first document data;
   generate a first relational data item and a second relational data item, the first relational data item indicating a relationship between the first event data item and the second event data item, and the second relational data item indicating a relationship between the second event data item and the third event data item; and
   generate a third relational data item indicating a presence of transitivity between the first event data item and the third event data item, when the first relational data item indicates a presence of transitivity between the first event data item and the second event data item, and the second relational data item indicates a presence of transitivity between the second event data item and the third event data item.

2. The data processing apparatus according to claim 1, wherein the processor is configured to include, in the third relational data item, third strength data indicating a relation strength between the first event data item and the third event data item.

3. The data processing apparatus according to claim 2, wherein the processor is configured to generate the third strength data based on first strength data indicating a relation strength between the first event data item and the second event data item and second strength data indicating a relation strength between the second event data item and the third event data item.

4. The data processing apparatus according to claim 1, wherein the processor is configured to generate the third relational data item when a similarity between the first event data item and the second event data item is greater than or equal to a threshold.

5. The data processing apparatus according to claim 4, wherein the processor is configured to:
   further extract a fourth event data item and a fifth event data item from input second document data; and
   when a fourth relational data item indicating a presence of transitivity between the fourth event data item and the fifth event data item is extracted and a similarity between the second event data item and the fourth event data item is greater than or equal to a threshold, generate a fifth relational data item indicating a presence of a relation between the first event data item and the fifth event data item.

6. The data processing apparatus according to claim 4, wherein the processor is configured to:
   further extract a sixth event data item and a seventh event data item from input second document data; and
   when a sixth relational data item indicating a presence of transitivity between the sixth event data item and the seventh event data item is extracted and a similarity between the first event data item and the sixth event data item is greater than or equal to a threshold, generate one or both of a seventh relational data item indicating a presence of a relation between the first event data item and the seventh event data item and an eighth relational data item indicating a presence of a relation between the sixth event data item and the second event data item.

7. The data processing apparatus according to claim 1, wherein the processor is configured to:
   calculate a number of hops indicating a relational distance between the first event data item and the third event data item; and
   refrain from adopting the third relational data item when the number of hops exceeds a predetermined value.

8. A data processing method comprising:
   extracting a first event data item, a second event data item and a third event data item from input first document data;
   generating a first relational data item and a second relational data item, the first relational data item indicating a relationship between the first event data item and the second event data item, and the second relational data item indicating a relationship between the second event data item and the third event data item; and
   generating a third relational data item indicating a presence of transitivity between the first event data item and the third event data item, when the first relational data item indicates a presence of transitivity between the first event data item and the second event data item, and the second relational data item indicates a presence of transitivity between the second event data item and the third event data item.

9. A non-transitory storage medium readable by a processor, storing therein a data processing program to cause the processor to:
   extract a first event data item, a second event data item, and a third event data item from input first document data;
   generate a first relational data item and a second relational data item, the first relational data item indicating a relationship between the first event data item and the second event data item, and the second relational data item indicating a relationship between the second event data item and the third event data item; and
   generate a third relational data item indicating a presence of transitivity between the first event data item and the third event data item when the first relational data item indicates a presence of transitivity between the first event data item and the second event data item, and the second relational data item indicates a presence of transitivity between the second event data item and the third event data item.

* * * * *